(12) United States Patent
Coulson et al.

(10) Patent No.: US 11,988,149 B1
(45) Date of Patent: May 21, 2024

(54) COIL-ON PLUG EXCITER

(71) Applicant: United States of America as represented by the Administrator of NASA, Washington, DC (US)

(72) Inventors: Keith Coulson, Houston, TX (US); Joseph W. Studak, Houston, TX (US); Eric A. Hurlbert, Houston, TX (US); Matthew J. Atwell, Houston, TX (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 17/932,166

(22) Filed: Sep. 14, 2022

Related U.S. Application Data

(60) Provisional application No. 63/243,957, filed on Sep. 14, 2021.

(51) Int. Cl.
  *H01T 13/38* (2006.01)
  *F02C 7/264* (2006.01)
  *F02K 9/42* (2006.01)

(52) U.S. Cl.
  CPC .............. *F02C 7/264* (2013.01); *F02K 9/425* (2013.01); *H01T 13/38* (2013.01)

(58) Field of Classification Search
  CPC ........... F02C 7/264; F02K 9/425; H01T 13/38
  USPC ............................................................. 415/1
  See application file for complete search history.

(56) References Cited

U.S. PATENT DOCUMENTS

| | | | |
|---|---|---|---|
| 5,844,462 A | 12/1998 | Rapoport et al. | |
| 9,287,686 B2 | 3/2016 | Camilli | |
| 9,591,741 B2* | 3/2017 | Larigaldie | H05H 7/02 |
| 11,585,331 B2* | 2/2023 | Hummelt | F03H 1/0093 |
| 2007/0113803 A1 | 5/2007 | Froloff et al. | |
| 2007/0182336 A1* | 8/2007 | Peschel | H05H 1/46 315/111.21 |
| 2010/0319644 A1 | 12/2010 | Choquette et al. | |
| 2014/0109886 A1 | 4/2014 | Singleton et al. | |
| 2015/0020502 A1* | 1/2015 | Larigaldie | H05H 7/02 60/202 |
| 2019/0154013 A1* | 5/2019 | Lazarev | H01G 4/40 |

* cited by examiner

*Primary Examiner* — J. Todd Newton
(74) *Attorney, Agent, or Firm* — Kurt G. Hammerle; Edward K. Fein

(57) ABSTRACT

A coil-on-plug (COP) exciter includes a COP and a housing configured to be coupled to and positioned at least partially between the COP and an engine. The COP exciter also includes an electrode core positioned at least partially within the housing. The electrode core has a first end and a second end. The first end is configured to be coupled to the COP. The COP exciter also includes an electrode tip configured to be coupled to the second end of the electrode core. A voltage is conducted from the COP, through the electrode core, and to the electrode tip, which generates a spark that is configured to energize a first propellant to start the engine.

18 Claims, 7 Drawing Sheets

COIL-ON PLUG EXCITER

CROSS-REFERENCE TO RELATED APPLICATIONS

This patent application claims priority to U.S. Provisional Patent Application No. 63/243,957, filed on Sep. 14, 2021, the entirety of which is incorporated by reference herein.

STATEMENT OF GOVERNMENT INTEREST

The embodiments described herein may be manufactured and used by or for the Government of the United States of America for governmental purposes without payment of any royalties thereon or therefor.

BACKGROUND

Some aircraft (e.g., spacecraft) use cryogenic propellants for their rocket engines. The cryogenic propellants are typically ignited using a gas-fed miniature combustor, which incorporates a spark gap, electrode, a high voltage cable, and a high voltage power supply located nearby, thus requiring the electronics to withstand severe environments found near the engine. The use of gas-phase propellants in the igniter of a cryogenic (e.g., liquid phase) main engine reduces the energy required for ignition, and enhances reliable starting in a vacuum, but requires a separate gasification and/or feed system. Historically, this solution is reasonably well-tolerated by large engines (e.g., an upper stage or primary in-space propulsion system) which can accommodate the relatively bulky solution and can afford to have a separate gas supply to the igniter assembly. However, this solution effectively prevents (or severely penalizes) the implementation of cryogenics on smaller attitude control thrusters.

SUMMARY

A coil-on-plug (COP) exciter is disclosed. The COP exciter includes a COP and a housing configured to be coupled to and positioned at least partially between the COP and an engine. The COP exciter also includes an electrode core positioned at least partially within the housing. The electrode core has a first end and a second end. The first end is configured to be coupled to the COP. The COP exciter also includes an electrode tip configured to be coupled to the second end of the electrode core. A voltage is conducted from the COP, through the electrode core, and to the electrode tip, which generates a spark that is configured to energize a first propellant to start the engine.

An engine assembly for an aircraft is also disclosed. The engine assembly includes a coil-on-plug (COP) exciter. The COP exciter includes a COP configured to receive a first voltage and to increase the first voltage to a second voltage that is sufficient to initiate ignition. The COP exciter also includes an electrode core having a first end and a second end. The first end is configured to be coupled to the COP. The COP exciter also includes an electrode tip coupled to the second end of the electrode core. The second voltage is conducted from the COP, through the electrode core, and to the electrode tip. The second voltage at the electrode tip generates a spark. The COP exciter also includes a housing coupled the COP. The electrode core is positioned at least partially within the housing. The COP exciter also includes a spacer positioned at least partially within the housing. The spacer is positioned at least partially between the COP and the electrode core. The COP exciter also includes a first insulator positioned at least partially within the housing. The first insulator includes a non-conductive polymer. The first insulator is configured to provide electrical insulation between the electrode core and the housing. The COP exciter also includes a second insulator positioned at least partially within the housing. The second insulator includes a ceramic material. The second insulator is configured to provide electrical insulation between the electrode core and the housing. The COP exciter also includes a first seal positioned at least partially within the housing. The first seal is configured to isolate pressure between the electrode core and the first insulator. The COP exciter also includes a second seal positioned at least partially within the housing. The second seal is configured to isolate pressure between the housing and the first insulator. An inner diameter of the second seal is greater than an outer diameter of the first seal. The engine assembly also includes an engine configured to be coupled to the housing. The electrode tip is positioned at least partially within the engine. The spark energizes a first propellant to start the engine.

A method for starting an engine is also disclosed. The method includes increasing a voltage using a coil-on-plug (COP) exciter. The COP exciter includes a COP configured to increase the voltage, an electrode core coupled to the COP, and an electrode tip coupled to the electrode core. The electrode tip is positioned at least partially within the engine. The voltage is conducted from the COP, through the electrode core, and to the electrode tip, which generates a spark. The method also includes supplying a first propellant to the COP exciter. The spark energizes the first propellant to create a plasma. The method also includes supplying a second propellant to the engine. The first and second propellants combine and combust. The engine runs on the first and second propellants after being started.

BRIEF DESCRIPTION OF THE DRAWINGS

The following figures form part of the present specification and are included to further demonstrate certain aspects of the presently described subject matter and should not be used to limit it. The present subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein.

DETAILED DESCRIPTION

Figures 1A, 1B:
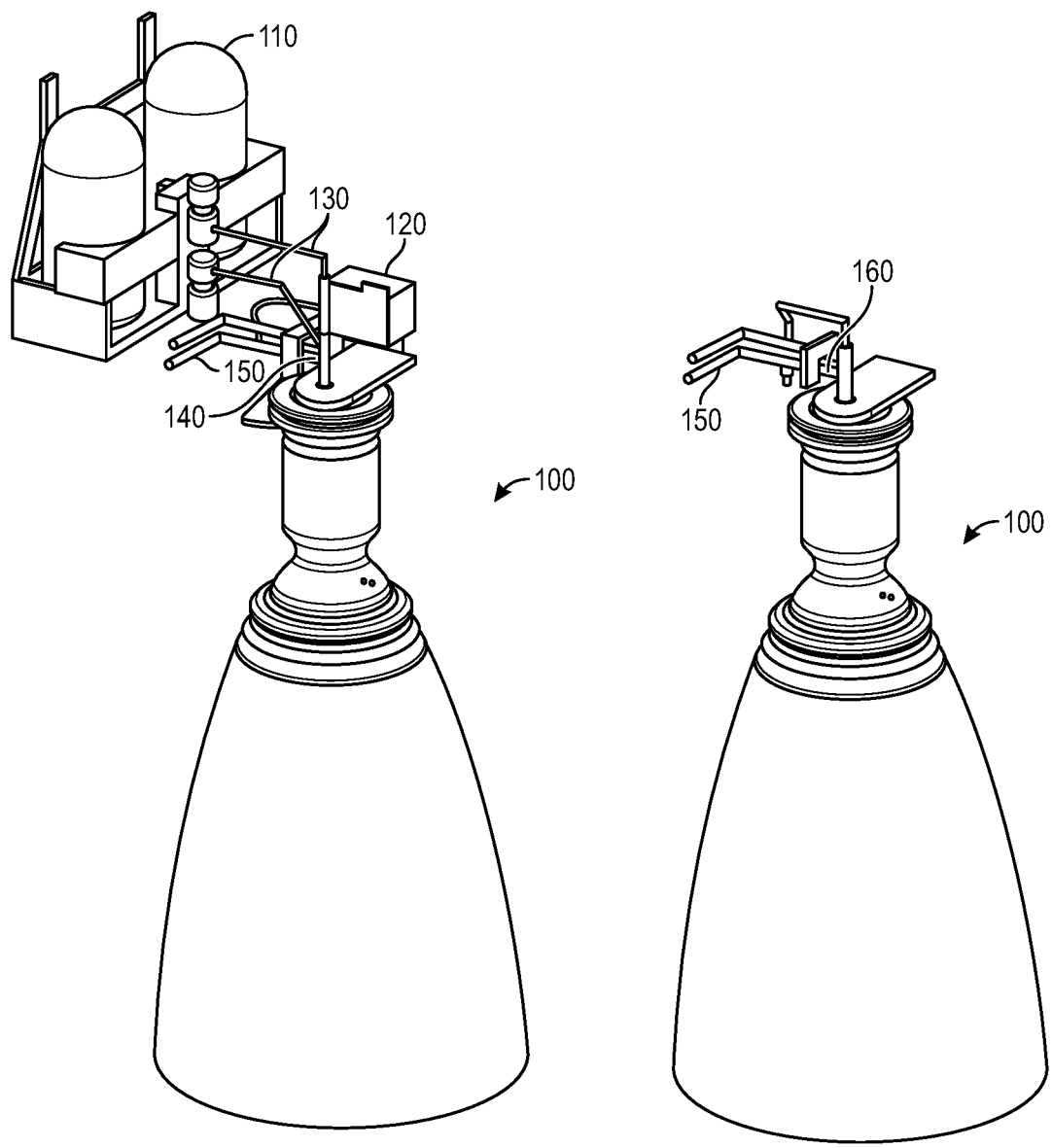
FIGS. 1A and 1B illustrate perspective views of two different main engine layouts, according to an embodiment.

Reference will now be made in detail to specific embodiments illustrated in the accompanying drawings and figures.

In the following detailed description, numerous specific details are set forth in order to provide a thorough understanding of the embodiments described herein. However, it will be apparent to one of ordinary skill in the art, now having the benefit of this detailed description, that other embodiments may be practiced without these specific details. In other instances, well-known methods, procedures, components, circuits, and networks have not been described in detail so as to assist in understanding aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the present disclosure.

The terminology used herein is for the purpose of describing particular embodiments only and is not intended to be limiting. As used in the description and the appended claims, the singular forms "a," "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, operations, elements, components, and/or groups thereof. Further, as used herein, the term "if" may be construed to mean "when" or "upon" or "in response to determining" or "in response to detecting," depending on the context.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The system and method disclosed herein provide a compact ignition assembly that improves engine applications and enables the use of cryogenic feed lines with one or more small thrusters, as typically found in spacecraft attitude control thruster systems. More particularly, the ignition assembly may include a coil-on-plug (COP) with an electrode (COP+electrode=COP exciter) that incorporates an inductive, high-voltage ignition coil potted into a mechanical assembly that delivers electrical energy through an electrode core encased in an electrically-insulating and pressure-sealed assembly. The system and method can operate in a vacuum environment and provide the spark energy to ignite combustible mixtures when the combustible mixture is at a low temperature and/or at a high pressure while maintaining a corona-free (e.g., no leakage of electrical energy) operation.

There are challenges of igniting a cryogenic liquid propellant in a vacuum. In contrast to gas-phase ignition, cryogenic liquid-phase ignition uses more energy to create the initial flame kernel that is augmented downstream as more propellant is added in the main stage of the thruster. Even after the kernel is established, it is still vulnerable to a phenomenon called quenching, in which the flame kernel is extinguished by the subsequent injection of the bulk propellant. This kernel must have enough energy to ignite the balance of propellants before it is quenched, or the thruster may not achieve steady state combustion. Ignition in a vacuum is also hampered by the cooling effect of propellant evaporation, which further chills the balance of cryogenic fluid entering the thruster.

Conventional exciter assemblies are typically derived from gas turbine or piston aircraft ignition systems and include several elements that are neither integrated nor suitable for cryogenic applications. The use of separate electronics enclosures, containing high-voltage circuitry, connected by high-voltage cables, with large high-voltage electrical connectors, to ceramic-core spark plugs that are prone to temperature-induced cracking or mechanical failure during vibration may contribute to unsuitability for either larger main engines or small attitude control thrusters, particularly when using cryogenic propellants.

The COP exciter described herein can operate in the challenging cryogenic environment and deliver adequate energy to light combustible propellant mixtures, without the mass, volume, complexity or purged high-voltage line requirement of the conventional exciter system. The COP exciter may also allow for the avionics to be remote from the actual electrode, removing sensitive electronics from the harsh environment of the main engine and/or or thrusters. The COP exciter may offer the benefits of reduced packaging, simplified fluid systems, and more reliable ignition. The total mass and volume savings can be substantial.

The COP exciter can be used for engines of any class, from large main engines to small reaction control engines (e.g., attitude control thrusters). An advantage of the COP exciter over conventional solutions may include a more compact design, allowing use in attitude control thrusters. The COP exciter may also omit high-voltage cables which are prone to breakage and/or voltage leakage. The COP exciter may also omit high-voltage connectors, which are large and heavy. As used herein, a high-voltage cable and/or a high-voltage connector refers to a component rated for a voltage from about 5,000 to about 50,000 volts. The COP exciter also includes no sensitive electronics near the combustion location or vibration-causing devices. Instead, the sensitive electronics can be relocated or co-located with other existing avionics remote from the engine. As used herein, "remote from the COP exciter" and/or "remote from the engine" refers to relative distance from the COP exciter and/or engine (e.g., 10 to 100 feet) rather than mounted to the engine or its secondary structure. Large (e.g., main) engines may also benefit from the more compact design, because no separate (e.g., dedicated) gas supply or nearby avionics are required.

FIGS. 1A and 1B illustrate perspective views of two different main engine layouts for comparative discussion. More particularly, FIG. 1A illustrates a discrete gas supply 110, igniter electronics 120, gaseous supply lines 130, an igniter and high voltage cable 140, and liquid supply lines 150 that are used to power a main engine 100 of a vehicle. The vehicle may be or include an aircraft. As used herein, an aircraft may be or include a spacecraft configured to travel outside of the Earth's atmosphere, a satellite, an airplane, a helicopter, an unmanned aerial vehicle (e.g., a drone), or the like. In another embodiment, the vehicle may also or instead be a ground-based vehicle (e.g., a car, a truck, a train, a boat, etc.).

FIG. 1B illustrates the main engine 100 along with the liquid supply 150 and an ignition assembly (also referred to as a COP exciter) 160 as described in further detail herein. As may be seen, the COP exciter 160 may obviate the gas supply 110, the igniter electronics 120, the gaseous supply lines 130, the igniter and high voltage cable 140, or a combination thereof, thereby providing a smaller, more lightweight system. The COP exciter 160 may use the same fluids (e.g., cryogenic liquid propellants) as the main engine 100.

Figure 2A:
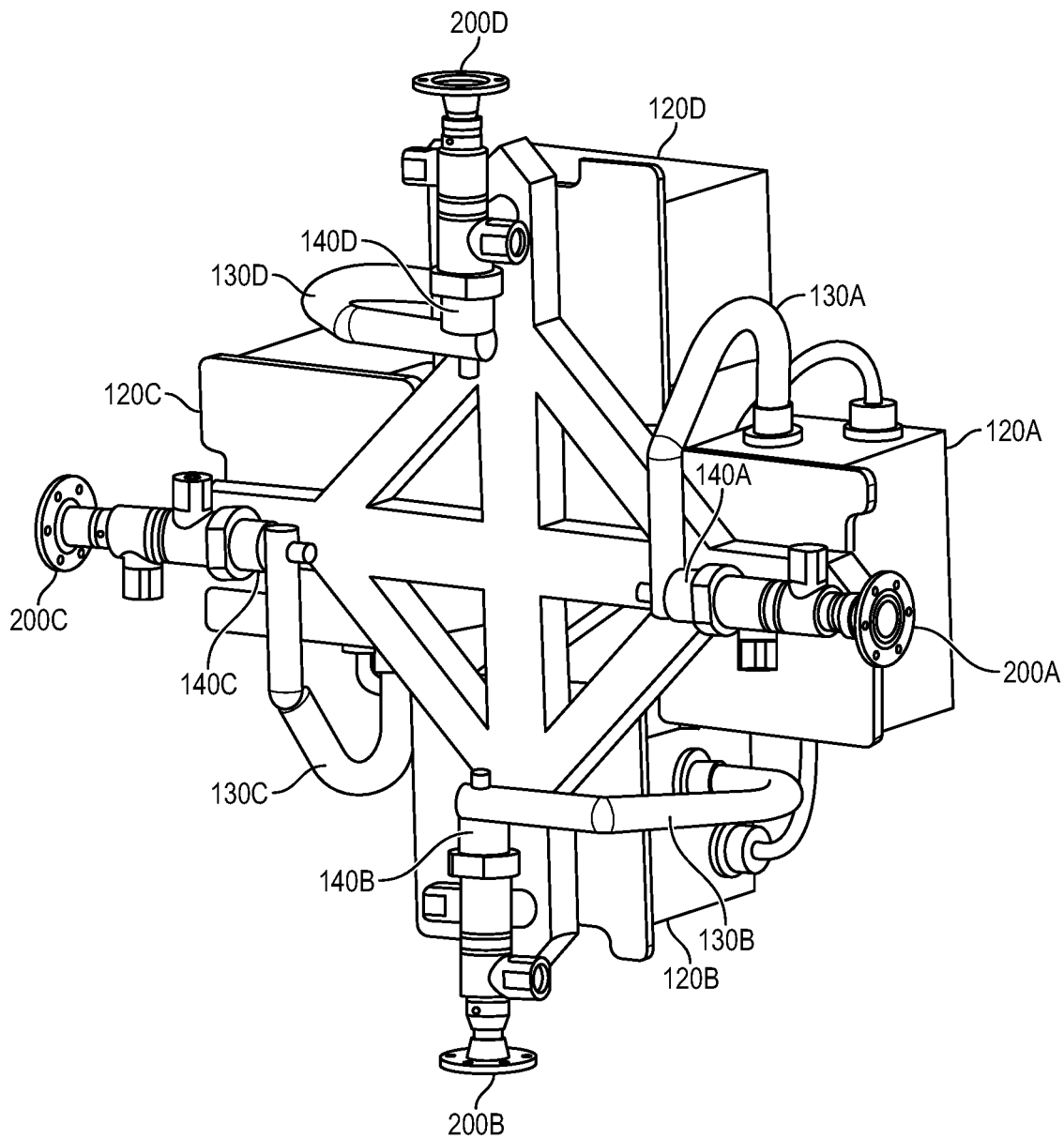
FIGS. 2A and 2B illustrate perspective views of two different clusters of attitude-control thrusters, according to an embodiment.
Figure 2B:
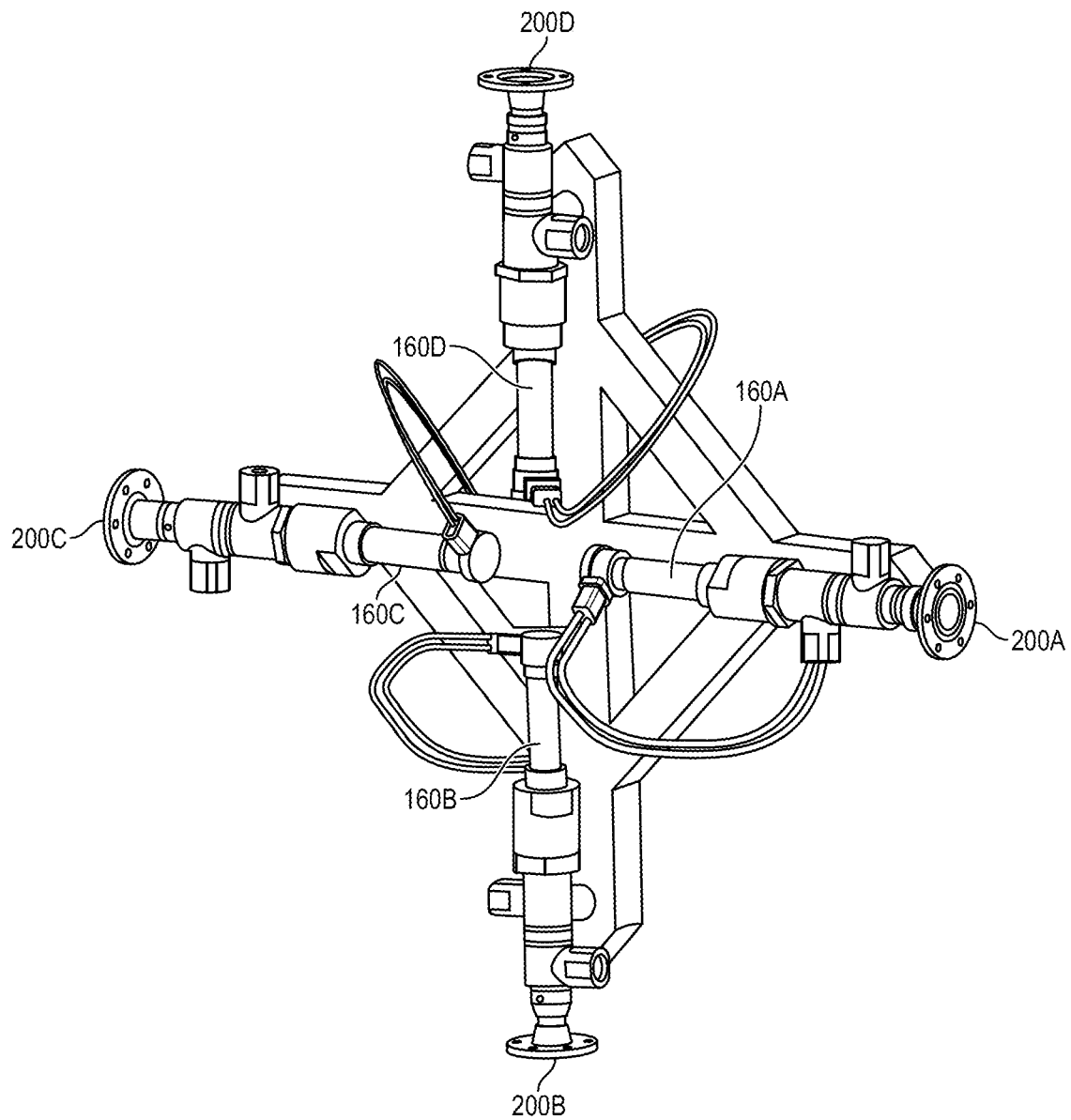

FIGS. 2A and 2B illustrate perspective views of two different clusters of attitude-control thrusters 200A-200D for comparative discussion. More particularly, FIG. 2A illustrates four attitude control thrusters 200A-200D with four discrete igniter electronics 120A-120D, gaseous supply lines 130A-130D, and igniters 140A-D. FIG. 2B illustrates four similar attitude control thrusters 200A-200D including COP exciters 160A-160D. As may be seen in FIG. 2B, the COP exciter 160 may obviate the igniter electronics 120A-120D, the gaseous supply lines 130A-130D, the igniters 140A-140D, or a combination thereof, thereby providing a smaller, more lightweight cluster of attitude-control thrusters 200A-200D.

The COP exciter 160 may be applicable to smaller thrusters, as are typically found in aircraft (e.g., spacecraft) attitude control systems 200A-200D (as shown in FIG. 2B); however, it may also offer improvement when used with larger main engines 100 (as shown in FIG. 1B). In contrast to main propulsion systems, which typically have a single large engine 100, attitude control systems 200A-200D for aircrafts may have two or more (e.g., up to several dozen) small thrusters, sometimes with two or more sizes installed on the same aircraft. The conventional bulky solution which is acceptable for a single large engine (e.g., engine 100) is unsuitable for the large number of small thrusters (e.g., thrusters 200A-200D), especially when considering that mass and volume are at a premium in aircraft design.

Figure 3:
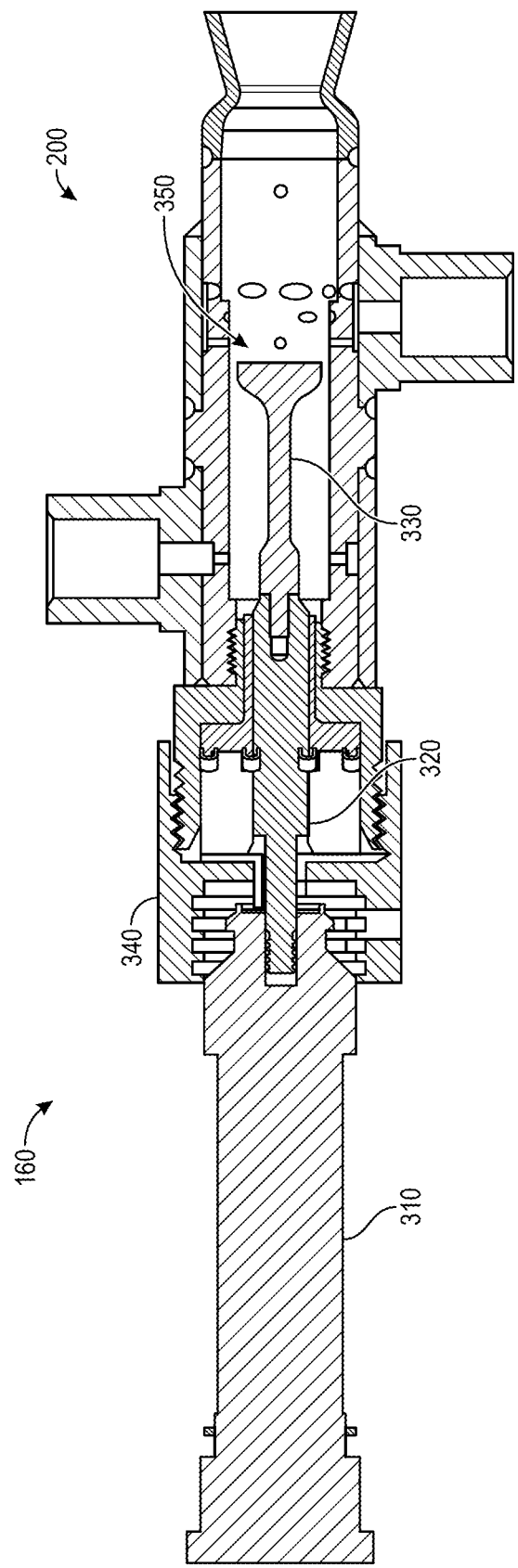
FIG. 3 illustrates a cross-sectional side view of one of the clusters shown in FIG. 2B including a coil-on-plug (COP) exciter and an attitude control thruster, according to an embodiment.

FIG. 3 illustrates a cross-sectional side view of one of the COP exciters 160 (e.g., COP exciter 160A) coupled to one of the thrusters 200 (e.g., thruster 200A) from FIG. 2B, according to an embodiment. The COP exciter 160 may include a coil-on-plug (COP) 310. The COP exciter 160 may also include an electrode core 320 that is configured to be coupled to the COP 310. The COP exciter 160 may also include (or be coupled to) an electrode tip 330 that is configured to be coupled to the electrode core 320. The electrode tip 330 may be positioned at least partially within the thruster 200 (or main engine 100). The COP exciter 160 may also include a (e.g., metallic) housing 340 that is positioned at least partially around the COP 310, the electrode core 320, and/or the electrode tip 330.

As described in greater detail below, voltage may be conducted from/through the COP 310, the electrode core 320, and/or the electrode tip 330, which generates one or more sparks across a spark gap 350 to energize one or more propellants (e.g., a cryogenic liquid propellant) to start the thruster 200 (or main engine 100). The electrode tip 330 may be customized for different applications, and it is easily replaced as appropriate due to wear or for development activities.

Figure 4:
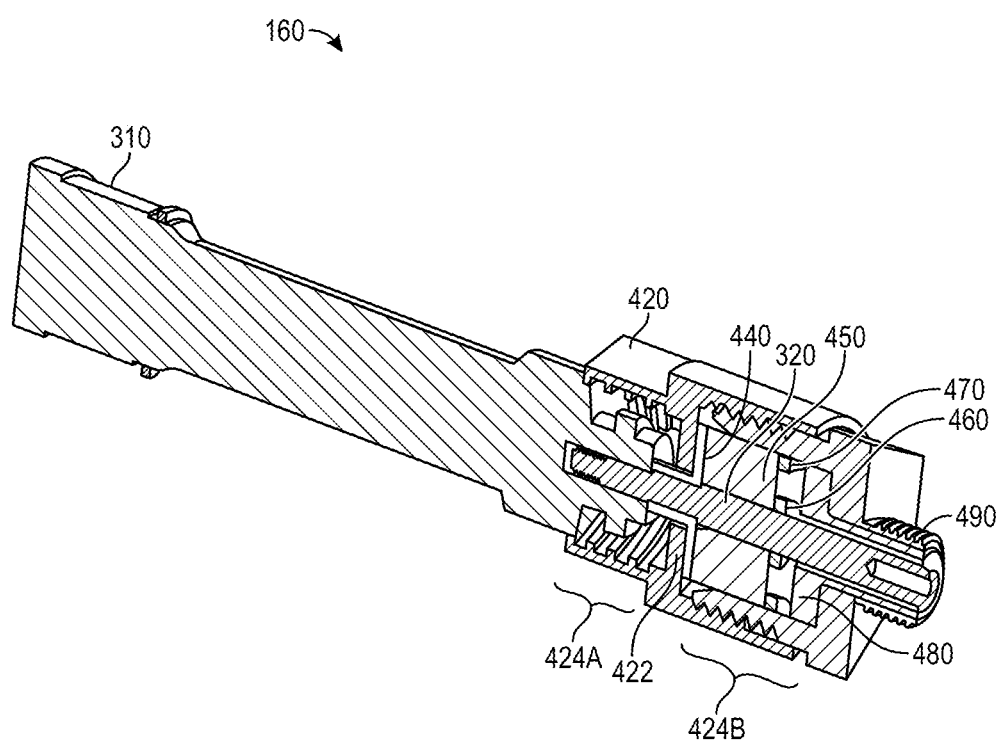
FIG. 4 illustrates a cross-sectional perspective view of the COP exciter, according to an embodiment.
Figure 5:
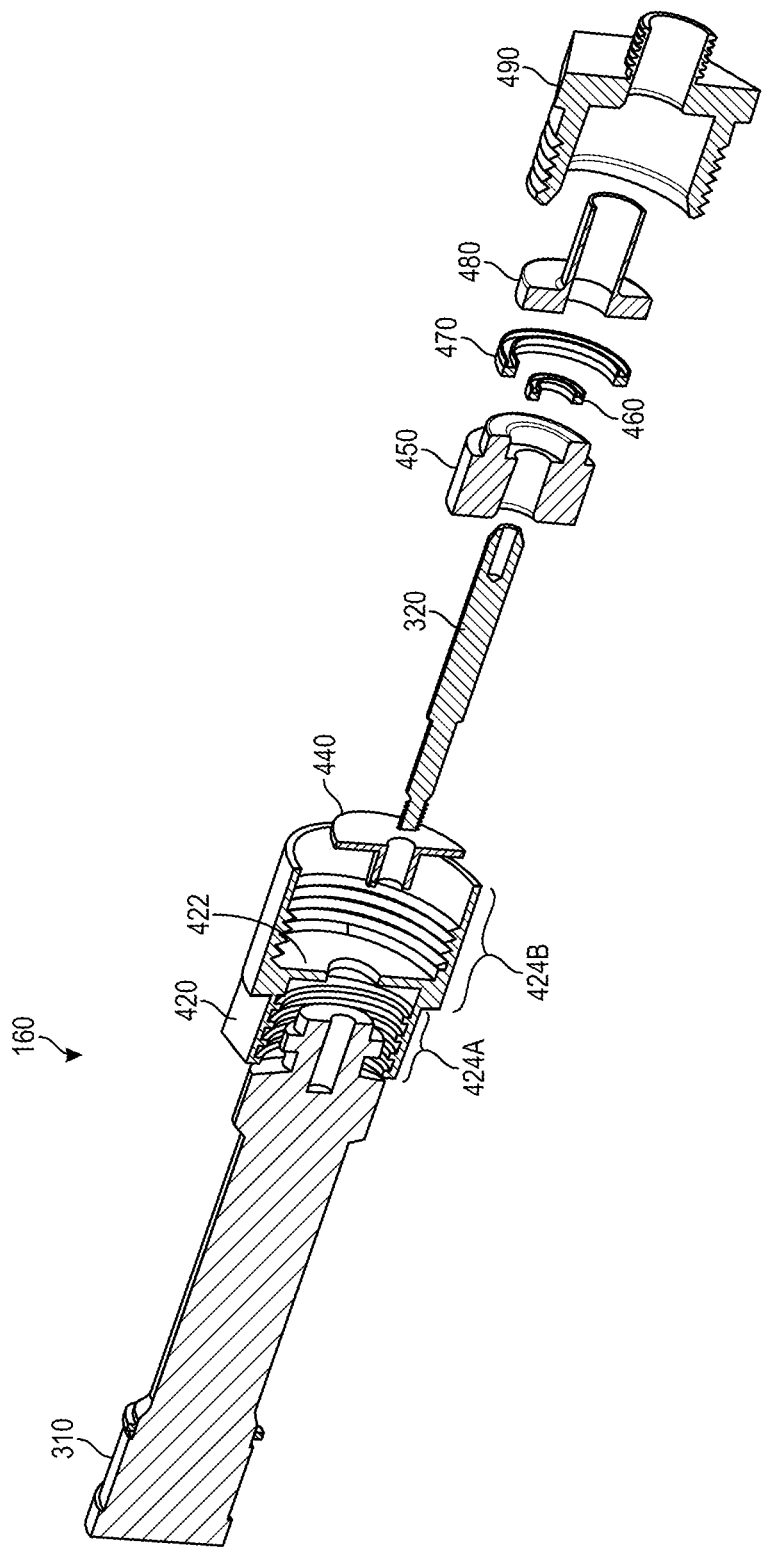
FIG. 5 illustrates an exploded perspective view of the COP exciter, according to an embodiment.

FIG. 4 illustrates a cross-sectional perspective view of the COP exciter 160, and FIG. 5 illustrates an exploded perspective view of the COP exciter 160, according to an embodiment. As mentioned above, the COP exciter 160 may be more lightweight and compact than conventional igniters and their companion cables and electronics. In one embodiment, a weight of the COP exciter 160 may be from 0.5 pounds to about 1 pound. A volume of the COP exciter 160 may be from about 2 cubic inches to about 8 cubic inches.

As mentioned above, the COP exciter 160 may include the COP 310. The COP 310 may convert a low-voltage control signal to a high-voltage spark source via induction.

As mentioned above, the COP 160 may include the housing 340 (see FIG. 3). As shown in FIGS. 4 and 5, the housing 340 may include a first (e.g., upper) housing 420. The upper housing 420 may be made of metal or other durable materials. The COP 310 may be coupled to and/or positioned at least partially within (i.e., potted into) a first (e.g., upper) end of the upper housing 420 using epoxy, which is hydrogen-compatible and/or extreme-temperature range compatible. As used herein, hydrogen-compatible refers to resistant to hydrogen embrittlement and having material properties that withstand hydrogen exposure without degradation. As used herein, extreme-temperature range compatible refers to temperatures ranging from about −450 degrees F. to about 3,000 degrees F. The envelope may be compact and facilitate the installation of nearby propellant valves used by and/or in cryogenic attitude control thrusters 200A-200D.

The COP exciter 160 may also include or define one or more chambers. In the embodiment shown in FIGS. 4 and 5, the upper housing 420 includes an inner shoulder 422 that defines two axially offset chambers 424A, 424B. The first (e.g., upper) chamber 424A may receive the COP 310 and/or hold the potting compound (e.g., epoxy). The second (e.g., lower) chamber 424B may receive a sealing element, electrical insulation, and/or threads for connection to a balance of the engine 100 or thruster 200. The sealing element may be or include polymers and/or other metallic or non-metallic seals such as Teflon-jacketed spring-energized seals, Teflon or other polymer or metallic O-rings, or coated rigid O-ring replacements, and thread sealants developed for high pressure, cryogenic, and/or high temperature service.

As mentioned above, the COP exciter 160 may also include the electrode core 320. A first (e.g., upper) end of the electrode core 320 may be coupled to (e.g., threaded into) a central high-voltage conductor of the COP 310. The electrode core 320 may extend through the upper housing 420. A second (e.g., lower) end of the electrode core 320 may be coupled to (e.g., threaded onto) the electrode tip 330 (as shown in FIG. 3). The electrode core 320 may conduct the voltage from the COP 310 to the electrode tip 330, which generates the spark(s) proximate to the inner wall of the body of the engine (e.g., thruster 200). The tip 330 may be separable from the electrode core 320 to allow adaptation of the COP exciter 160 to work with a variety of different thruster or main engine igniter applications.

The electrode core 320 may be thicker than the electrode tip 330. For example, the electrode core 320 may have a thickness (e.g., diameter) from about 0.025 inches to about 0.60 inches, and the electrode tip 330 may have a thickness (e.g., diameter) from about 0.05 inches to about 0.60 inches. The combination of a relatively thick electrode core 320 with the relatively thin electrode tip 330 provides several advantages over the conventional constant-diameter electrode through the entire length. First, the thick electrode core 320 is stiffer, reducing the likelihood of cracking the ceramic insulator 480 (described below), which provides thermal protection from hot combustion gases. Second, the thick electrode core 320 facilitates the use of high-performance seals 460, 470 (described below), which means the ceramic insulator 480 may no longer be configured to provide high-pressure sealing. Separating these functions of pressure sealing and thermal insulation is a difference and improvement of the COP exciter 160 over conventional spark exciter systems.

The COP exciter 160 may also include a spacer 440, which may be positioned at least partially within the upper housing 420 (e.g., in the lower chamber 424B). The spacer 440 may also be positioned at least partially (e.g., axially and/or radially) between the COP 310 and the electrode core 320. The spacer 440 may center the electrode core 320 within the upper housing 420. The spacer 440 may also prevent the epoxy from leaking to the threads of the upper housing 420 during assembly. In one embodiment, the spacer 440 may also be integral with the upper insulator 450 (described below).

The COP exciter 160 may also include a first (e.g., upper) insulator 450. The upper insulator 450 may be positioned at least partially within the upper housing 420 and at least partially around the electrode core 320. The upper insulator 450 may be made from a non-conductive polymer. For example, the upper insulator 450 may be made from polyamide plastic (e.g., Vespel SP-1). In an embodiment, the upper insulator 450 may not include a ceramic material. The upper insulator 450 may provide electrical insulation between the upper housing 420 and the electrode core 320. The upper insulator 450 may also hold the upper and lower seals 460, 470 in place (described below). As mentioned above, in one embodiment, the upper insulator 450 may also be integral with the spacer 440.

The use of a polymer-based electrical insulator 450 may preclude the need for a full-length ceramic jacket, which is used in conventional spark exciter systems. The conventional ceramic jacket is prone to breakage for two reasons. First, when one end is exposed to cryogenic temperature propellants, thermally-induced stresses can cause the conventional insulator to crack or break. Second, when propellants are flowing over the electrode tip, they cause the electrode tip to oscillate, which may mechanically break the conventional ceramic insulator. The use of the polymer upper insulator 450 means the length can be adjusted to reduce thermal stresses. In this embodiment, for example, the length may be from about 0.50 inches to about 0.80 inches. In addition, the lower insulator 480 may not provide a sealing function, allowing the inner diameter of the lower insulator 480 to be tapered proceeding along the length of the electrode core 320, thus accommodating any residual oscillation from the electrode tip 330.

The COP exciter 160 may also include a first (e.g., inner) seal 460 and/or a second (e.g., outer) seal 470. The seals 460, 470 may be positioned at least partially within the upper housing 420 and at least partially around the electrode core 320. The seals 460, 470 may be spring-energized, pressure-assisted, cryogenic-rated seals, with polytetraflouroethylene (e.g., Teflon) jackets and metallic springs, O-rings, or coated metallic seals. The inner seal 460 and/or outer seal 470 may prevent the pressure generated during combustion within the engine 100 and/or thruster 200 from entering the upper housing 420 and/or the lower housing 490 (described below). This configuration, in turn, may protect the epoxy and the COP 310 from the high pressures of the combustion chamber. As shown, the inner seal 460 may have a smaller inner diameter and/or outer diameter than the outer seal 470. For example, the outer diameter of the inner seal 460 may be smaller than the inner diameter of the outer seal 470. As a result, the inner seal 460 may isolate pressure radially between the electrode core 320 and the upper insulator 450, and the outer seal 470 may isolate pressure radially between the upper insulator 450 and the lower housing 490. In one embodiment, the seals 460, 470 may be substantially co-planar (e.g., concentric). In another embodiment, the seals 460, 470 may be separated axially along the length of the insulator 450. In other words, they may not be co-planar. In another embodiment the seals 460, 470 may be located on the rear face of the lower insulator 480 (described below) rather than radially sealing.

The COP exciter 160 may also include a second (e.g., lower) insulator 480. The lower insulator 480 may be positioned at least partially within the upper housing 420 and at least partially around the electrode core 320. The lower insulator 480 may be made of machined ceramic material. The lower insulator 480 may thermally insulate the upper insulator 450 from the hot combustion gases in the engine 100 and/or thruster 200. The lower insulator 480 may also provide electrical insulation between the electrode core 320 and the lower housing 490 (described below), preventing voltage leakage or misplaced sparking during operation. The lower insulator 480 may also be tapered on the inner diameter to accommodate flexion and the (e.g., thick) electrode core 320 to resist breaking.

In one embodiment, the lower insulator 480 may not provide a pressure sealing function, which is challenging for a ceramic material trying to seal against a metallic material. In addition, the lower insulator 480 has a reduced length, which reduces thermal stresses. For example, the length of the illustrated lower insulator 480 may be from about 0.60 inches to about 0.90 inches. The length of the lower insulator 480 may be adjusted to suit individual engine applications.

The capability of separating the pressure sealing function (e.g., provided by the seals 460, 470) from the ceramic insulating function (e.g., provided by the lower insulator 480) means that sealing is improved over the simple press-fit of a conventional thin electrode into a conventional ceramic insulator. In addition, thermal resistance may be improved by allowing the lower insulator 480 to be less exposed to the high temperature differential between the electrode tip 330 and the COP exciter housing, which includes the upper housing 420 and the lower housing 490 (described below).

As mentioned above, the COP 160 may include the housing 340 (see FIG. 3). As shown in FIGS. 4 and 5, in addition to the first (e.g., upper) housing 420, the housing 340 may include a second (e.g., lower) housing 490. The lower housing 490 may be positioned at least partially within and/or coupled to (e.g., threaded into) the upper housing 420. The insulators 450, 480 and/or the seals 460, 470 may be positioned at least partially within the upper housing 420 and/or the lower housing 490. The lower housing 490 may be configured to be positioned at least partially within and/or coupled to (e.g., threaded into) the combustion chamber of the engine 100 or the attitude control thruster 200. The lower housing 490 may facilitate adaptation of the COP exciter 160 to many different engines 100 or thrusters 200. It may also separate the pressure sealing from the electrical and/or thermal insulation functions. Other embodiments to facilitate integration with the engine may include snap ring grooves, retention brackets, or other features that provide adequate load support of the COP exciter.

The absence of discrete electronics enclosures and high-voltage cables with large high-voltage electrical connectors and pressure-sealed cavities, the limited use of ceramic materials, and the separate sealing and electrical insulation features may all contribute to the suitability of this design for both main engines 100 and small attitude control thrusters 200A-200D. The sensitive electronics can be co-located with other existing avionics remote from the engines 100 and/or thrusters 200A-200D. Large engines 100 also benefit from the absence of separate gas supplies. The electrode tip 330 may be easily customized for different applications and easily replaced due to wear or for development activities. A pair of small gauge wires rated for low voltage (e.g., from about 8V to about 32V) may be used to energize the COP 310.

Figure 6:
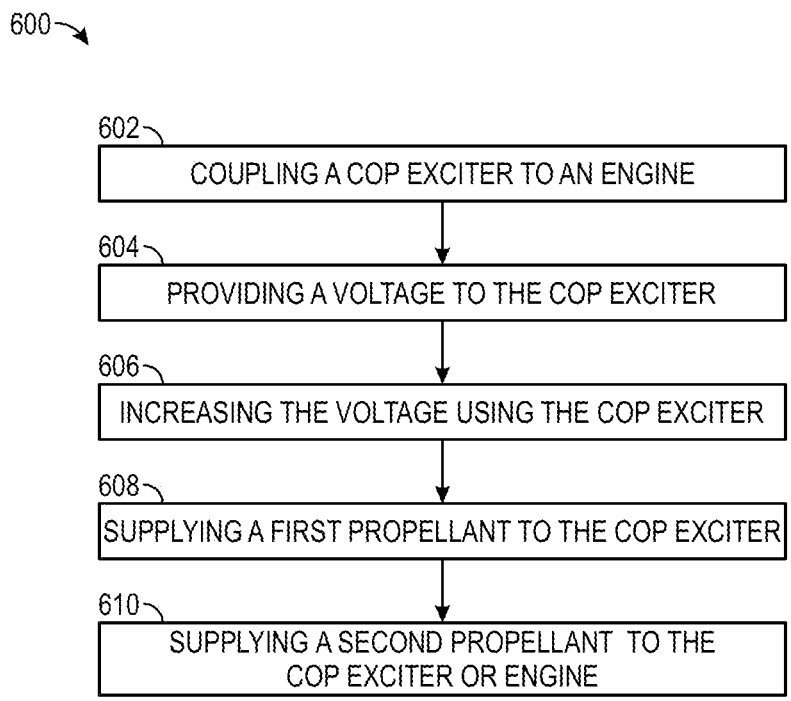
FIG. 6 illustrates a flowchart of a method for starting an engine using the COP exciter, according to an embodiment.

FIG. 6 illustrates a flowchart of a method 600 for starting an engine, according to an embodiment. More particularly, the method 600 may be for igniting a low-temperature, high-pressure cryogenic liquid propellant in an engine (e.g., main engine 100 and/or thruster 200) of an aircraft (e.g., spacecraft) in a vacuum environment. An illustrative order of the method 600 is provided below. One or more steps of the method 600 may be performed in a different order, combined, repeated, or omitted.

The method 600 may include coupling a COP exciter 160 to an engine 100, 200, as at 602. This step may include positioning the electrode tip 330 and/or the lower housing 490 at least partially within the engine 100, 200. This step may also include engaging threads on the outer surface of the lower housing 490 with corresponding threads on the inner surface of the engine 100, 200.

The method 600 may include providing/supplying a voltage to the COP exciter 160, as at 604. More particularly, the remote electronics on the aircraft may generate the low voltage (e.g., 8-32 Vdc) supplied to the COP exciter 160.

The method 600 may also include increasing the voltage by using the COP exciter 160, as at 606. More particularly, the COP 310 may increase the voltage from a first (e.g., low) voltage to a second (e.g., high) voltage. The high voltage may be conducted from the COP 310, through the electrode core 320, to the electrode tip 330. The high voltage at the electrode tip 330 may generate one or more sparks across the spark gap 350 (FIG. 3).

The method 600 may also include providing/supplying a first propellant to the COP exciter 160, as at 608. As mentioned above, the first propellant may be or include a low-temperature, high-pressure cryogenic liquid propellant. For example, the temperature of the first propellant may be from about −450 degrees F. to about 150 degrees F., and the pressure of the first propellant may be from about 50 psia to about 5000 psia. The sparks proximate to the electrode tip 330 may energize the first propellant, which causes the first propellant to become a ball of plasma that is highly excited and short-lived. The first propellant may be added in stages to achieve the total flow required by the COP exciter 160.

The method 600 may also include providing/supplying a second propellant to the COP exciter 160 and/or the engine 100, 200, as at 610. In one embodiment, the second propellant may be the same as the first propellant. In another embodiment, the second propellant may be different than the first propellant. More particularly, the second propellant may have a different composition, temperature, pressure, or a combination thereof. For example, an oxidizer (e.g., cryogenic oxygen) and a fuel (e.g., cryogenic hydrogen, methane, and/or other hydrocarbons) may be combined in the COP exciter 160 to provide combustion. After combustion, these hot gasses may provide thrust adequate for attitude control of a thruster 200 or a torch suitable for igniting the main engine 100.

When the first propellant passes through the spark gap, some portion of it is converted to plasma, and when the second propellant is introduced nearby, the chemical reaction (e.g., combustion) releases heat. The combustion may be self-sustaining. In one embodiment, additional second propellant (and/or other propellants) may be added to increase the size of the combustion flame. The second propellant may be supplied to the COP exciter 160 and/or the engine 100, 200 in stages. Thus, a small ball of plasma becomes a flame kernel, which may be augmented in stages to any size. The resulting hot gasses may provide thrust (e.g., the attitude control thruster 200 has been started), or they may ignite the main engine flow of propellants (e.g., the main engine 100 is started).

The propellants may allow the engine 100 or thruster 200 to continue to run after being started. For example, the propellant flow may allow the engine 100 or thruster 200 to run after the spark is discontinued (either main engine 100 or thruster 200). In another example, the main engine propellant flow may allow the main engine 100 to run after both the spark and flow of propellant are discontinued (main engine 100).

As shown in the embodiment in FIG. 2B, the aircraft may include a cluster of engines (e.g., thrusters 200A-200D), each having a different COP exciter 160 coupled thereto. In this instance, steps 602-606 may be performed for each set of COP exciter 160A-160D and corresponding thruster 200A-200D. In one example, one or more of steps 602-606 may be performed simultaneously for each set. In another example, one or more of steps 602-606 may be performed sequentially for each set. In this example, each set may be ignited or started when it is needed for attitude control.

The COP exciter 160 and method 600 may be implemented with variations, such as: full fuel or oxidizer flow over the spark gap, partial flow over the spark gap with additional injection downstream in stages, alternating stages of oxidizer or fuel flow injection, thruster operation with or without continuous sparking after ignition, use of the COP exciter 160 as the first stage of a multi-stage ignition assembly for larger engines 100, or the associated combustors used for turbopump assemblies or other similar combustion devices that require ignition.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to explain the principles of the invention and its practical applications, thereby enabling others skilled in the art to utilize the various embodiments with various modifications as are suited to the particular use contemplated.

What is claimed is:

1. A coil-on-plug (COP) exciter, comprising:
a COP;
a housing configured to be coupled to and positioned at least partially between the COP and an engine;
an electrode core positioned at least partially within the housing, wherein the electrode core has a first end and a second end, and wherein the first end is configured to be coupled to the COP;
an insulator positioned at least partially within the housing, wherein the insulator comprises a non-conductive polymer, and wherein the insulator is configured to provide electrical insulation between the housing and the electrode core;
a seal positioned at least partially within the housing, wherein the seal is configured to isolate pressure between the electrode core and the insulator; and an electrode tip configured to be coupled to the second end of the electrode core, wherein a voltage is conducted from the COP, through the electrode core, and to the electrode tip, which generates a spark that is configured to energize a first propellant to start the engine.

2. The COP exciter of claim 1, further comprising a spacer positioned at least partially within the housing, wherein the spacer is positioned radially between the COP and the electrode core.

3. The COP exciter of claim 1, further comprising a second insulator positioned at least partially within the housing, wherein the second insulator comprises a ceramic material, and wherein the second insulator is configured to provide electrical insulation between the housing and the electrode core.

4. The COP exciter of claim 1, further comprising a second seal positioned at least partially within the housing, wherein the second seal is configured to isolate pressure between the housing and the insulator.

5. The COP exciter of claim 1, wherein the electrode core has a greater diameter than the electrode tip.

6. The COP exciter of claim 1, wherein the first propellant comprises a cryogenic liquid propellant having a temperature from about −450 degrees F. to about 150 degrees F. and a pressure from about 50 psia to about 5000 psia.

7. The COP exciter of claim 1, wherein the engine generates combustion gases, wherein the housing and one or more components therein prevent the COP from experiencing a temperature greater than about 3000 degrees F. from the combustion gases, and wherein the housing and the one or more components therein prevent the COP from experiencing a pressure greater than about 5000 psia from the combustion gases.

8. The COP exciter of claim 1, wherein the COP exciter is configured to start the engine when the COP exciter is in a vacuum environment.

9. An engine assembly for an aircraft, the engine assembly comprising:
   a coil-on-plug (COP) exciter comprising:
   a COP configured to receive a first voltage and to increase the first voltage to a second voltage that is sufficient to initiate ignition;
   an electrode core having a first end and a second end, wherein the first end is configured to be coupled to the COP;
   an electrode tip coupled to the second end of the electrode core, wherein the second voltage is conducted from the COP, through the electrode core, and to the electrode tip, and wherein the second voltage at the electrode tip generates a spark;
   a housing coupled the COP, wherein the electrode core is positioned at least partially within the housing;
   a spacer positioned at least partially within the housing, wherein the spacer is positioned at least partially between the COP and the electrode core;
   a first insulator positioned at least partially within the housing, wherein the first insulator comprises a non-conductive polymer, and wherein the first insulator is configured to provide electrical insulation between the electrode core and the housing;
   a second insulator positioned at least partially within the housing, wherein the second insulator comprises a ceramic material, and wherein the second insulator is configured to provide electrical insulation between the electrode core and the housing;
   a first seal positioned at least partially within the housing, wherein the first seal is configured to isolate pressure between the electrode core and the first insulator; and
   a second seal positioned at least partially within the housing, wherein the second seal is configured to isolate pressure between the housing and the first insulator, and wherein an inner diameter of the second seal is greater than an outer diameter of the first seal; and
   an engine configured to be coupled to the housing, wherein the electrode tip is positioned at least partially within the engine, and wherein the spark energizes a first propellant to start the engine.

10. The engine assembly of claim 9, wherein the housing comprises a first housing and a second housing that are configured to be coupled together, wherein the first housing is configured to be coupled to the COP, wherein the second housing is configured to be coupled to the engine, wherein the first housing comprises an inner shoulder that defines a first chamber and a second chamber, wherein at least a portion of the COP is positioned within the first chamber, and wherein the spacer, the first insulator, the second insulator, the first seal, the second seal, or a combination thereof are positioned within the second chamber.

11. The engine assembly of claim 9, wherein the engine assembly does not comprise a high-voltage cable or a high-voltage connector, and wherein the engine assembly does not use a gas-phase fuel.

12. The engine assembly of claim 9, wherein the engine comprises a main engine, wherein the spark energizes the first propellant and creates a plasma, wherein the plasma reacts chemically with a second propellant to generate combustion within the engine, and wherein the first and second propellants comprise a liquid phase.

13. The engine assembly of claim 9, wherein the aircraft comprises a spacecraft configured to travel outside of the Earth's atmosphere, wherein the engine comprises an attitude control thruster, wherein the fuel comprises a cryogenic liquid propellant having a temperature from about −450 degrees F. to about 50 degrees F. and a pressure from about 50 psia to about 5000 psia.

14. A method for starting an engine, the method comprising:
   increasing a voltage using a coil-on-plug (COP) exciter, wherein the COP exciter comprises:
   a COP configured to increase the voltage;
   an electrode core coupled to the COP; and
   an electrode tip coupled to the electrode core, wherein the electrode tip is positioned at least partially within the engine, and wherein the voltage is conducted from the COP, through the electrode core, and to the electrode tip, which generates a spark;
   supplying a first propellant to the COP exciter, wherein the spark energizes the first propellant to create a plasma; and
   supplying a second propellant to the engine, wherein the first and second propellants combine and combust, and wherein the engine runs on the first and second propellants after being started.

15. The method of claim 14, wherein the first propellant and the second propellant comprise a cryogenic liquid propellant.

16. The method of claim 15, wherein the cryogenic liquid propellant has a temperature from about −450 degrees F. to about 50 degrees F. and a pressure from about 50 psia to about 5000 psia.

17. The method of claim 14, wherein the engine comprises an attitude control thruster on a spacecraft that is configured to travel outside of the Earth's atmosphere.

18. The method of claim 14, wherein the COP exciter is configured to start the engine when the COP exciter is in a vacuum environment.

\* \* \* \* \*